Aug. 4, 1959     L. V. GEWISS     2,897,971
FILTERING CARTRIDGE FOR LIQUIDS AND GASES
Filed Nov. 12, 1954     2 Sheets-Sheet 1
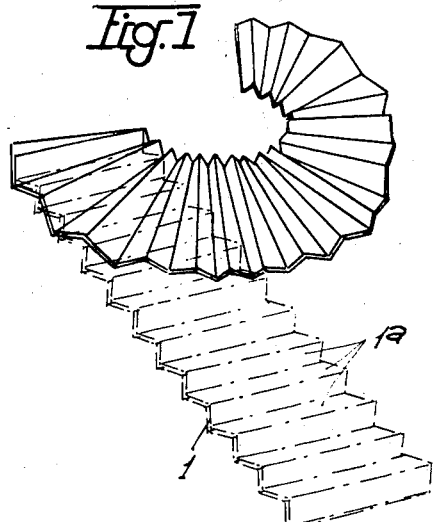
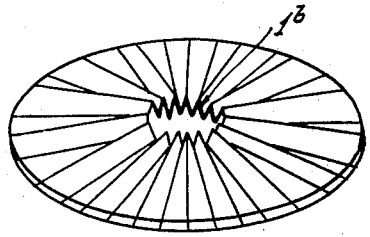
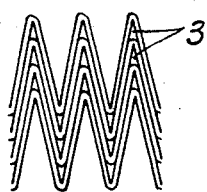
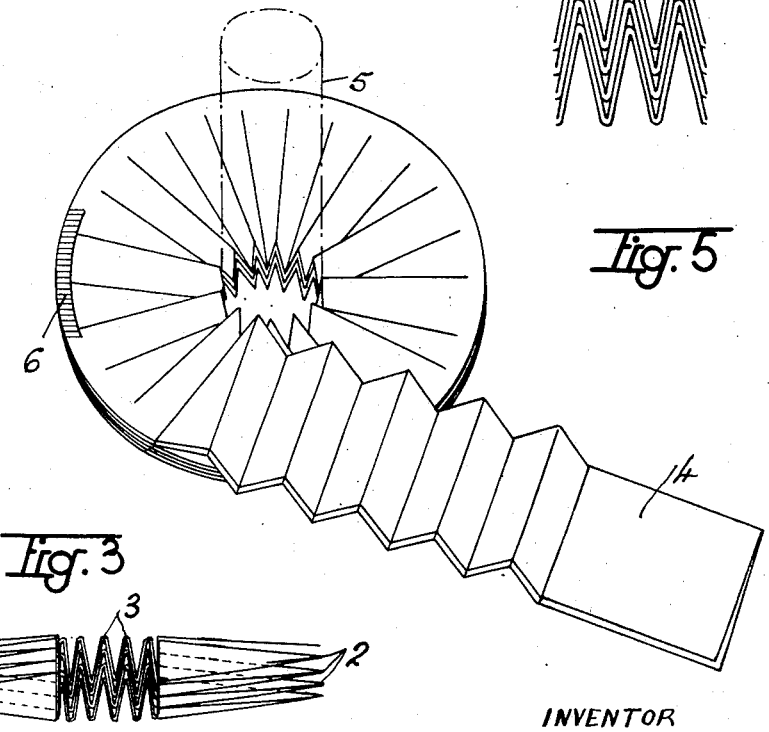
INVENTOR
LUCIEN VICTOR GEWISS
BY Linton and Linton
ATTORNEYS

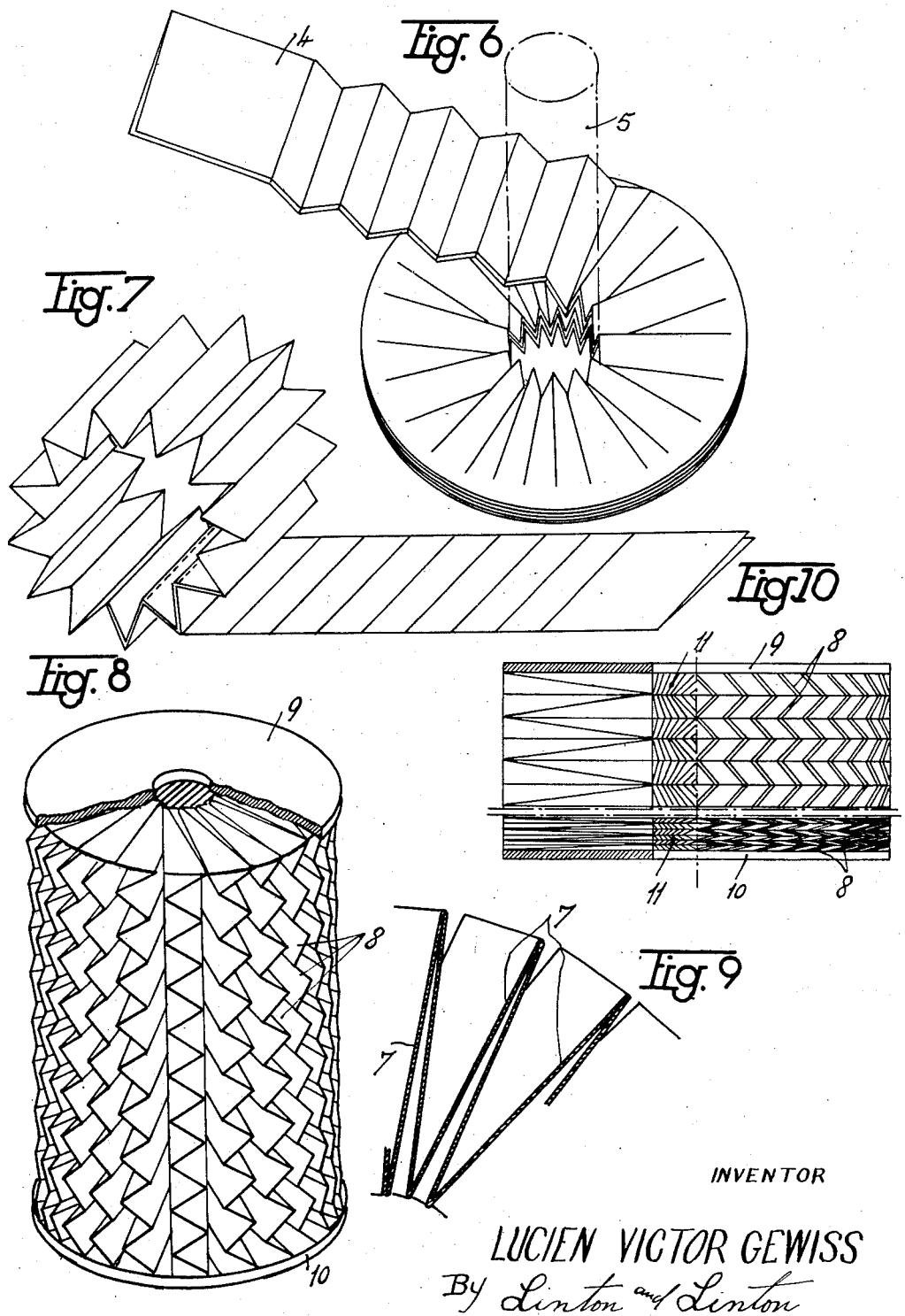

United States Patent Office 2,897,971
Patented Aug. 4, 1959

2,897,971

FILTERING CARTRIDGE FOR LIQUIDS AND GASES

Lucien Victor Gewiss, Ville d'Avray, France

Application November 12, 1954, Serial No. 468,499

Claims priority, application France November 28, 1953

2 Claims. (Cl. 210—493)

Filtering materials in the form of sheets are generally considered as the most suitable for a satisfactory filtration of liquids and gases.

The necessity of reducing the bulk of filtering systems made with such sheet material has led to various and numerous prior arrangements in which the sheet elements previously cut into shape are piled up or else in which one or more filtering sheets are folded in zig-zag formation, or again these two procedures are suitably associated.

Now, although it has been possible to obtain thus filtering areas of considerable capacity in filters of a small bulk, it has been found that various other conditions required for satisfactory filtration have been satisfied hitherto only in an imperfect manner; taking into account the varying or constant pressure to which the fluids to be filtered are submitted. These conditions are chiefly as follows:

Actual fluidtightness between the filtering sections;
Unvarying grade of filtering;
Stability of the throughput of filtered fluid;
Lasting efficiency of the filtering system;
Provision of arrangements adapted to prevent the breaking under the action of pressure of certain sections of the filtering sheets;
A sufficient housing for the impurities retained in the filter, etc.

My invention has for its object the execution of large area and small bulk filtering cartridges which satisfy the different above-mentioned conditions. It covers also in addition to the actual filtering cartridges, various methods for executing same.

A filtering cartridge according to the present invention includes chiefly a filtering sheet or a system of filtering sheets forming a continuous tubular generally cylindrical system the wall of which forms a plurality of superposed radial folds defining inside the cartridge an empty axial space, the said folds being stacked in the area extending at the periphery of the empty space in a manner such as to produce in the corresponding area a greater density of filtering material than in all other points of the cartridge, the folds joining one another uninterruptedly and being urged into close relationship with the interposition between them of gaps which serve for the flow of liquid undergoing treatment, the two ends of the said tubular system being closed by fluidtight covers of which at least one is provided with a central opening communicating with the above-mentioned empty axial space.

The cartridge thus constituted encloses an inner space extending throughout its height, surrounded by filtering material folded accordionwise and having no communication with the outside except through the central opening formed in one or possibly both of the fluidtight covers. This cartridge may be fitted in and secured to a filtering machine of any suitable type including a fluidtight vat and it is then sufficient to make the inner or the outer space defined by the cartridge inside the vat communicate with the input of a fluid under pressure provided in the machine, the other of the said spaces being then connected with the output of fluid so that the filtering may be operated correctly since the fluid is constrained to pass from one of said spaces into the other through the filtering material.

The advantages of my invention and various embodiments thereof will appear in the reading of the following description, reference being made to accompanying drawings given by way of example and by no means in a limiting sense, and wherein:

Fig. 1 is a perspective view of a folded element adapted to form part of a filtering cartridge, in the course of production;

Fig. 2 is a perspective view of the same filtering element when finished;

Fig. 3 is an axial cross-section of a number of elements similar to that of Fig. 2, in stack formation, glued together along their periphery to constitute an assembly forming the cartridge;

Fig. 4 shows on a larger scale a fragment of the development of the wall of the axial recess formed at the center of the elements thus stacked;

Fig. 5 is a perspective view of a further embodiment of a cartridge according to the present invention;

Fig. 6 is a perspective view of a modification of the arrangement of Fig. 5;

Fig. 7 is a perspective view of a still further embodiment;

Fig. 8 is a perspective view of a filtering cartridge obtained through another method before the axial compression thereof with a part of the cover removed;

Fig. 9 is a partial horizontal cross-section on a larger scale of the cartridge illustrated in Fig. 8;

Fig. 10 is a vertical, half-sectional axial and half-elevational view of the same cartridge, partly before axial compression and partly after compression thereof.

In the production of a filtering cartridge according to my invention, I may operate for instance as follows and as shown in Fig. 1:

I start from a strip 1 of yielding filtering material such as paper, fabric or the like, the breadth of which is equal to the difference between the outer diameter of the cartridge and the diameter of the axial space to be provided in the latter, while its length is equal to the perimeter of the cartridge. I then fold this strip lengthwise in two and pleat it transversely so as to form a succession of pleats 1a which are all equal or which form equal pairs, the breadth of said pleats or pairs of pleats being equal to a submultiple of the length of the strip, as illustrated in dot-and-dash lines in Fig. 1. I then bend the strip thus folded to form an annulus in its plane, the open longitudinal edges of the folded strip lying in this case on the outside of the annulus, and I secure together the cooperating ends of the annular double ply strip e.g. by gluing. This produces a hollow annular uninterrupted element shown in Fig. 2, the outer periphery of which forms approximately a flat circular line the diameter of which is equal to that of the cartridge, while its central section defined by a line 1b is pleated in chevron shape, and its horizontal projection forms a circle of a diameter corresponding to that of the axial recess in the cartridge, the pleats extending radially from the said inner periphery in fanwise formation.

A number of identical annular elements 2, 2 are then stacked with the pleats of the successive elements engaging one another, as shown in Fig. 3, and they are secured flat over one another, as provided by a gluing of their adjacent free substantially unpleated outer edges. When the stacking has reached the height required for the complete cartridge, the latter is finished by securing a flat circular annular cover of cardboard, metal or the like suitable material, provided possibly with a central opening, over the unglued free outer edges of the lowermost element and of the uppermost element.

Fig. 4 shows how the pleats of filtering material interengage along the periphery of the axial recess or opening of the cartridge and form joining chevrons. It should be remarked that the angles at the apices of the said chevrons are such that they form between the superposed pleats triangular spaces 3 which are open to the flow of fluid undergoing treatment. Whatever may be the magnitude of the pressure exerted on the pleats as a whole, spaces cannot be completely closed since the radii of curvature of the filtering material in the inner angles of the folds are of necessity smaller than those in the outer angles.

It should also be noticed that, throughout the cartridge, the filtering surfaces face one another so that the pressure of the fluid to be filtered cannot have a detrimental action on them. When the fluid flows from the outside towards the inside of the cartridge, the fluid flows after filtration between the filtering sheets forming each annular element so as to reach the pleats and then the spaces 3 beyond which it enters the axial opening of the cartridge. The fluid progresses in the opposite direction when it flows from the inside to the outside of the cartridge.

The above arrangements ensure thus a complete reliability both as concerns the grade of the filtering and the certainty that not even the smallest section of the surface of filtering sheets will break under the action of a permanent or fortuitous excess of pressure.

Practice shows that there is no particular difficulty in the construction of an arrangement such as that which has just been described. It is also possible to construct each of the annular elements by bending the longitudinally folded and transversely pleated strip 1, obtained as disclosed, in a manner such that its open longitudinal edges lie inwardly, i.e. along the periphery of the axial recess of the cartridge; in this case, the assembly of the stacked elements is performed through a gluing of their inner free edges. In all cases, the above-described assembling may be constructed either through gluing or through clamping. When the annular elements are constructed as described with reference to Figs. 1 and 2, it is possible, in fact, to do away with the successive connections thereof along their peripheries, and it is sufficient to hold them fast between the outer covers of the cartridge with the interposition between the successive elements of annular peripheral shims or stays made of cardboard or paper of a suitable thickness, which shims are cut at intervals so as to provide a passage for the fluid.

I have illustrated in Fig. 5 another manner of obtaining a cartridge the appearance of which is quite similar to that of the previously described cartridge although its geometrical structure is somewhat different. According to this manner of operating, I start from a strip of filtering material 4 the breadth of which is equal as previously to the difference between the outer diameter of the cartridge and the diameter of the axial space to be formed in the latter, the length of this strip being, however, indefinite. After folding this strip lengthwise in two and having pleated it transversely in the manner disclosed hereinabove, I wind it in a continuous manner in successive turns or layers round a cylindrical mandrel 5, the free edges of the strip being arranged at the outer periphery of the wound strip. The central section is pleated to a maximum while the free outer edges are relatively flattened. The breadth of the strip, the size of the folds, the diameter of the mandrel 5 and the outer diameter of the cartridge are selected in a manner such that the number of pleats in each convolution of the winding is an integer and consequently the successive layers interengage in nested relation so as to form a kind of one-threaded helicoid surface.

During the winding procedure, I resort to a suitable arrangement for compressing the strips and distributing adhesive material or staples onto same so as to secure in a continuous manner at 6 the lower free outer edge of one convolution of the strip section that is being wound to the upper free outer edge of the immediately preceding convolution. I obtain thus a unit to the ends of which it is sufficient to secure the two terminal covers so as to obtain a cartridge of the same type as that described hereinabove with the difference that it has the shape of a one-thread helicoid.

I may also as illustrated in Fig. 6 wind an unlimited length of the strip 4 in a manner such that its free edges may be located on the inner side of the winding, the free edges of any two successive convolutions being secured to each other along the inner periphery of the cartridge. I obtain the same practical result of a helicoid in this case as in the precedingly disclosed arrangement.

On the other hand, instead of starting from a strip folded lengthwise in two, I may as well start from a strip folded lengthwise into four, six, eight, or the like multiple of two, said strip being thenafter pleated and wound as precedingly. This would lead to helicoidal arrangements having 2, 3, 4 threads or more.

Instead of gluing or clamping together the free edges of the successive convolutions of the helicoidal strip, I may also insert simply between them interrupted inserts adapted to provide for fluid tightness when the whole arrangement is held fast between the two terminal covers.

Fig. 7 illustrates a further method which allows forming cartridge elements of a generally helicoidal structure of one of the two above disclosed types, while of a smaller height. According to this further method, instead of winding in flat formation the strip 4 after folding and pleating same, I wind it over itself about an axis parallel to the plane of the strip so as to provide the first convolution with a number of pleats corresponding to the length of the perimeter of the cartridge (thirteen in the case of Fig. 7) and the outer free edge of each convolution is then glued to the inner free edge of the following convolution. As the winding continues with each chevron pleat engaging a chevron pleat in the preceding convolution, the inner pleats nearer the axis yield and gather to a greater extent under the pressure of the successive convolutions so as to leave room for the further plies wound on the outside of the first plies. It is necessary to stop the winding procedure before the central pleats are compressed to a too considerable extent, so as to allow the room required for the system to tilt and to give the convolutions of the winding a flat formation. This tilting movement is performed by urging towards the axis of the winding one of the pleated bases, either that which is glued or the other, which closes the pleating of this base while the other expands along the periphery of the cartridge.

The superposition of a suitable number of helicoidal elements which are then secured endwise together produces, after the ends of the unit obtained have been closed by covers, a cartridge of the same type as those illustrated in Figs. 5 and 6.

The different types of cartridges which have been disclosed are provided with pleats arranged fanwise and extending either in successive transverse cross-sectional planes as in the case of Figs. 1 to 4 or else along helicoidal surfaces which are consequently oblique with reference to the axis of the cartridge as in the case of the embodiments illustrated in Figs. 5 to 7. The chevron-shaped pleats forming the inner wall of the central opening in such cartridges are thus arranged along generally circular or helical lines according to the case.

Figs. 8 to 10 relate to an embodiment which allows obtaining a cartridge of the same type as the preceding cartridges and corresponding to the limit case where the chevrons are aligned along lines parallel with the axis of the cartridge.

It is possible to execute such a cartridge, starting from a single sheet of filtering material of a generally rectangular shape and the size of which depends on the one hand on its actual thickness and on the other hand on the outer diameter and on the height of the cartridge to be obtained and also on the diameter of its axial opening. The sheet is first folded longitudinally in a direction corresponding to the height of the cartridge to be produced so as to form folds 7 (Fig. 9) which are all of equal size, their breadth being equal to the radial size of the cartridge, i.e. to the difference between its outer radius and the radius of the axial opening. The system is then pleated in a direction perpendicular to the folds 7 so as to produce small transverse pleats 8 (Figs. 8 and 10) which are all similar, after which the terminal edges of the sheet are glued or otherwise secured together throughout the length of the cartridge blank, the corresponding pleats engaging each other on either side of the connecting line between the said terminal edges. I then distribute the vertical rows of pleats 7 round the axis of the cartridge blank in a uniform star formation and I secure to the ends of the blank covers such as 9 and 10 so as to obtain the final cartridge illustrated in perspective view in Fig. 8. It is then sufficient to compress the cartridge axially so as to crush the vertically superposed pleats as clearly shown in the lower section of Fig. 10, this compression finishing the cartridge. Fig. 10 shows clearly the vertical arrangement assumed in this embodiment by the chevron-shaped pleats 11 along the inner periphery of the cartridge opening.

The above-disclosed arrangement may obviously be constructed using methods which are more or less different from those described hereinabove as to particular detail. For certain applications and chiefly when it is desired for the sake of fluidtightness to ensure an efficient clamping of the cartridge inside the filtering apparatus inside which it is fitted, it may be of interest to insert between its covers a perforated stay either inside the axial opening of the cartridge or over the outer periphery of the latter. In this case, the chevron-shaped pleats are no longer submitted directly to the clamping action exerted on the cartridge, and a certain freedom may be left to them, taking into account the value of the pressure exerted by the fluid to be filtered.

The inner stay may, in the case of high pressures, serve also as a bearing for the inner ends of the chevron-shaped pleats since the spaces formed between the said chevron-shaped pleats provide for the throughput of fluid.

It is also possible under the same conditions and in accordance with the procedure disclosed hereinabove, to execute cartridges the outer and inner outlines of which are those of a polygon with sharp or rounded angles and having curvilinear or rectilinear sides.

What I claim is:

1. A filtering cartridge of generally cylindrical shape having an empty axial space of cylindrical shape, comprising a continuous sheet of filtering material formed with equal pleats arranged in tiers substantially parallel to the geometrical axis of the cartridge, said tiers of pleats extending throughout the height of the cartridge and being arranged radially from the empty axial space to the outer periphery of the cartridge with the pleats of the adjacent tiers engaging one with another.

2. An annular filtering cartridge comprising a long continuous sheet of flexible filtering material folded lengthwise to form folds of equal size and of breadth equal to the annular radial depth, said folds having small similar transverse pleats extending in a direction perpendicular to the folds and being stacked in columns to engage each other around the cartridge axis in a uniform star formation.

References Cited in the file of this patent

UNITED STATES PATENTS

| | | |
|---|---|---|
| 2,278,603 | Williams | Apr. 7, 1942 |
| 2,395,449 | Briggs | Feb. 26, 1946 |
| 2,421,704 | Kasten | June 3, 1947 |
| 2,456,292 | Manwaring | Dec. 14, 1948 |
| 2,488,726 | Judkins | Nov. 22, 1949 |
| 2,556,521 | Chase | June 12, 1951 |
| 2,675,127 | Layte | Apr. 13, 1954 |
| 2,683,537 | Dobrolet | July 13, 1954 |

FOREIGN PATENTS

| | | |
|---|---|---|
| 437,614 | France | Feb. 23, 1912 |
| 16,250 | France | Dec. 10, 1912 |
| | (Addition to No. 437,614) | |
| 729,531 | France | Apr. 26, 1932 |